(12) United States Patent
Takezawa et al.

(10) Patent No.: US 12,387,882 B2
(45) Date of Patent: Aug. 12, 2025

(54) ELECTROLYTIC CAPACITOR

(71) Applicant: SUN Electronic Industries Corp., Shijonawate (JP)

(72) Inventors: Takashi Takezawa, Shijonawate (JP); Masakazu Hosogi, Shijonawate (JP); Hirokazu Nishikori, Shijonawate (JP)

(73) Assignee: SUN Electronic Industries Corp., Shijonawate (JP)

( * ) Notice: Subject to any disclaimer, the term of this patent is extended or adjusted under 35 U.S.C. 154(b) by 357 days.

(21) Appl. No.: 17/801,909

(22) PCT Filed: Feb. 28, 2020

(86) PCT No.: PCT/JP2020/008507
§ 371 (c)(1),
(2) Date: Apr. 28, 2023

(87) PCT Pub. No.: WO2021/171611
PCT Pub. Date: Sep. 2, 2021

(65) Prior Publication Data
US 2023/0326685 A1     Oct. 12, 2023

(51) Int. Cl.
*H01G 9/10*  (2006.01)
*H01G 9/025* (2006.01)
*H01G 9/035* (2006.01)
*H01G 9/145* (2006.01)

(52) U.S. Cl.
CPC .............. *H01G 9/10* (2013.01); *H01G 9/025* (2013.01); *H01G 9/035* (2013.01); *H01G 9/145* (2013.01)

(58) Field of Classification Search
CPC .......... H01G 9/15; H01G 9/145; H01G 9/035; H01G 9/025; H01G 9/028; H01G 9/10
See application file for complete search history.

(56) References Cited

U.S. PATENT DOCUMENTS

| | | | |
|---|---|---|---|
| 6,128,179 A | 10/2000 | Morokuma | |
| 11,380,493 B2 * | 7/2022 | Takezawa | H01G 9/145 |

(Continued)

FOREIGN PATENT DOCUMENTS

| | | |
|---|---|---|
| CN | 101057306 A | 10/2007 |
| EP | 1580773 A1 | 9/2005 |

(Continued)

OTHER PUBLICATIONS

Extended European Search Report dated Dec. 12, 2023, issued in corresponding European Patent Application No. 20920866.9.

(Continued)

Primary Examiner — David M Sinclair
(74) Attorney, Agent, or Firm — Morgan, Lewis & Bockius LLP

(57) ABSTRACT

A capacitor includes a capacitor element having a predetermined liquid preparation held between a pair of electrodes facing each other across a separator, a body case for housing the capacitor element, and a sealing member made of rubber for sealing seals the body case. A supplying portion is provided in contact with the sealing member to supply the liquid preparation held in the capacitor element to the sealing member. The liquid preparation has a lipid-soluble sealing member deterioration preventing agent dissolved in a lipophilic solvent. The sealing member deterioration preventing agent supplied by the supplying portion to the sealing member permeates the sealing member. The ratio by weight of the sealing member deterioration preventing agent in the sealing member to the sealing member is 0.1% by weight to 25% by weight.

18 Claims, 7 Drawing Sheets

(56) References Cited

U.S. PATENT DOCUMENTS

| | | | |
|---|---|---|---|
| 11,915,887 B2* | 2/2024 | Takezawa | H01G 9/035 |
| 11,990,286 B2* | 5/2024 | Takezawa | H01G 9/02 |
| 12,027,323 B2* | 7/2024 | Takezawa | H01G 9/151 |
| 2008/0316679 A1 | 12/2008 | Sugihara et al. | |
| 2012/0300368 A1 | 11/2012 | Matsuura et al. | |
| 2015/0255220 A1 | 9/2015 | Komatsu et al. | |
| 2016/0064151 A1 | 3/2016 | Matsuura et al. | |
| 2017/0148582 A1 | 5/2017 | Matsuura et al. | |
| 2017/0162341 A1 | 6/2017 | Ashino et al. | |
| 2018/0119306 A1 | 5/2018 | Tsubaki et al. | |
| 2018/0218849 A1 | 8/2018 | Matsuura et al. | |
| 2020/0141020 A1 | 5/2020 | Tsubaki et al. | |
| 2020/0143997 A1 | 5/2020 | Matsuura et al. | |
| 2020/0258693 A1 | 8/2020 | Matsuura et al. | |

FOREIGN PATENT DOCUMENTS

| | | |
|---|---|---|
| EP | 2506275 A1 | 10/2012 |
| EP | 3855464 A1 | 7/2021 |
| EP | 4030452 A1 | 7/2022 |
| JP | H07-086101 A | 3/1995 |
| JP | 2000-100670 A | 4/2000 |
| JP | 2005-209902 A | 8/2005 |
| JP | 2006-120830 A | 5/2006 |
| JP | 2007-080895 A | 3/2007 |
| JP | 2009-176647 A | 8/2009 |
| JP | 2014-182978 A | 9/2014 |
| JP | 2017-228738 A | 12/2017 |
| JP | 2018-074046 A | 5/2018 |
| WO | 2011/099261 A1 | 8/2011 |
| WO | 2014/050913 A1 | 4/2014 |

OTHER PUBLICATIONS

International Search Report (with partial translation) dated May 26, 2020, issued in corresponding International Patent Application No. PCT/JP2020/008507.

Office Action dated Dec. 17, 2024, issued in corresponding Japanese Patent Application No. 2024-045106.

* cited by examiner

ELECTROLYTIC CAPACITOR

TECHNICAL FIELD

The present invention relates to a capacitor sealed with a sealing member.

BACKGROUND ART

A known capacitor is disclosed in Patent Document 1. This capacitor has a body case, a capacitor element, and a sealing member. The body case is formed of metal, in the shape of a bottomed tube, and its circumferential wall in a cylindrical shape is closed at one end and is left open at the other end to have an opening.

The capacitor element has an anode foil and a cathode foil, each having an oxide film formed on it, wound up with a separator in between, and is housed inside the body case. Between the anode and cathode foils, a conductive polymer and an electrolytic solution are held. The electrolytic solution contains a predetermined hardly-volatile solvent. The opening of the body case having the capacitor element housed in it is sealed with a sealing member made of rubber.

With the capacitor described above, owing to the electrolytic solution containing the hardly-volatile solvent, it is possible to suppress evaporation of the solvent in the electrolytic solution in a high-temperature environment such as in an engine room, and also to achieve a low ESR in low- to high-temperature environments.

Patent Document 2 discloses a capacitor in which a hydrophilic polymer compound is held between an anode foil and a cathode foil. The hydrophilic polymer compound holds moisture, and with the moisture it can repair a defect in an oxide film formed on the anode foil.

CITATION LIST

Patent Literature

Patent Document 1: JP-A-2017-228738 (pages 4 to 9; FIG. 1)
Patent Document 2: WO 2014/050913 (pages 9 to 23; FIG. 2)
Patent Document 3: JP-A-2000-100670 (pages 2 to 4; FIG. 1)

SUMMARY OF INVENTION

Technical Problem

Inconveniently, when the capacitor disclosed in Patent Document 1 mentioned above is used in a high-temperature environment as at 150° C., as the sealing member made of rubber deteriorates, a minute crack may develop in it. The minute crack in the sealing member may serve as a start point of a larger crack under concentrated stress, eventually reducing the effective thickness of the rubber as the sealing member. With a reduced effective thickness, the sealing member transmits an increased amount of moisture, and this degrades the characteristics of the capacitor. The capacitor thus has low humidity-resistance.

Moreover, according to general knowledge, when a polymer such as rubber is exposed to the energy of heat or light in the presence of oxygen as in air, the generation of a radical may trigger a chain of oxidation reactions and this leads to degraded physical properties. To cope with that, Patent Document 3 teaches mixing in the sealing member an antioxidant (anti-aging agent) for suppressing oxidation reactions.

Here, as the antioxidant mixed in the sealing member exerts its antioxidant effect, it is consumed and is gradually depleted. When a capacitor is used in a high-temperature environment, as the antioxidant is depleted, the sealing member quickly deteriorates, resulting in the sealing member transmitting an increased amount of moisture. Thus, there is demand for a capacitor that, even when used in a high-temperature environment as at 150° C., suppresses deterioration of the sealing member so as to offer a long lifetime combined with high humidity-resistance.

Likewise, when the capacitor disclosed in Patent Document 2 mentioned above is used in a high-temperature environment, as the sealing member deteriorates, it transmits an increased amount of moisture, and this degrades the characteristics of the capacitor.

An object of the present invention is to provide a capacitor with a long lifetime combined with enhanced humidity resistance.

Solution to Problem

To achieve the above object, according to one aspect of the present invention, a capacitor includes: a capacitor element that has a predetermined liquid preparation held between a pair of electrodes facing each other across a separator; a body case in which the capacitor element is housed; and a sealing member that is made of rubber and that seals the body case. A supplying portion is provided that makes contact with the sealing member and that supplies the liquid preparation held in the capacitor element to the sealing member. The liquid preparation has a lipid-soluble sealing member deterioration preventing agent dissolved in a lipophilic solvent. The sealing member deterioration preventing agent supplied by the supplying portion to the sealing member permeates the sealing member. The ratio by weight of the sealing member deterioration preventing agent in the sealing member to the sealing member is 0.1% by weight to 25% by weight.

According to another aspect of the present invention, in the capacitor described above, the sealing member deterioration preventing agent may be a compound that is oxidized more easily than ingredients of the sealing member.

According to another aspect of the present invention, in the capacitor described above, the sealing member deterioration preventing agent may have a molecular weight of 200 to 3000.

According to another aspect of the present invention, in the capacitor described above, the liquid preparation is an electrolytic solution having, dissolved in the lipophilic solvent, the sealing member deterioration preventing agent and an electrolyte.

According to another aspect of the present invention, in the capacitor described above, the electrolyte may contain an organic amine salt, and the electrolytic solution may contain a hydrophobic organic amine that forms the organic amine salt.

According to another aspect of the present invention, in the capacitor described above, the capacitor element may hold a solid electrolyte formed of a conductive polymer, and the conductive polymer may contain a dopant having a sulfonic acid group (sulfo group).

According to another aspect of the present invention, in the capacitor described above, the capacitor element may hold a solid electrolyte formed of a conductive polymer, and a dopant in the conductive polymer may have a substituent group of a sulfonic acid group.

According to another aspect of the present invention, in the capacitor described above, the capacitor element may hold a solid electrolyte formed of a conductive polymer, and the electrolytic solution may contain a hydrolyzable ester compound.

According to another aspect of the present invention, in the capacitor described above, the hydrolyzable ester compound may be a boric acid ester compound, and the a concentration of the boric acid ester compound in the electrolytic solution may be 0.1% by weight to 20% by weight.

According to another aspect of the present invention, in the capacitor described above, the capacitor element may hold a solid electrolyte formed of a conductive polymer.

According to another aspect of the present invention, in the capacitor described above, the supplying portion may be formed by the separator.

According to another aspect of the present invention, in the capacitor described above, a central part of the face of the sealing member facing the capacitor element may protrude relative to a peripheral part of the face.

According to another aspect of the present invention, in the capacitor described above, the body case may have a constriction that protrudes from the inner face of the body case to press the outer circumferential face of the sealing member, and the ridge of the constriction may be arranged farther from the capacitor element than the middle of the sealing member in its thickness direction.

According to another aspect of the present invention, in the capacitor described above, the supplying portion may couple the separator with the sealing member.

According to another aspect of the present invention, in the capacitor described above, the sealing member deterioration preventing agent may be a lipid-soluble vitamin.

According to another aspect of the present invention, in the capacitor described above, the lipid-soluble vitamin may be a tocopherol or tocotrienol.

According to another aspect of the present invention, in the capacitor described above, the lipophilic solvent may be gamma-butyrolactone.

According to another aspect of the present invention, in the capacitor described above, the lipophilic solvent may be one of polyethylene glycol, glycerol, and polyglycerol coupled with a lipophilic group.

According to another aspect of the present invention, in the capacitor described above, the liquid preparation may contain: the lipophilic solvent; one of sulfolane, ethylene glycol, diethylene glycol, and polyethylene glycol; and an amphiphilic compound.

Advantageous Effects of Invention

According to the present invention, a capacitor element holds a liquid preparation having a lipid-soluble sealing member deterioration preventing agent dissolved in a lipophilic solvent, and a supplying portion makes the liquid preparation supplied from the capacitor element permeate the sealing member. It is thus possible to suppress an increase in the amount of transmitted moisture resulting from deterioration of the sealing member. It is hence possible to provide a capacitor with a long lifetime combined with high humidity resistance.

DESCRIPTION OF EMBODIMENTS

First Embodiment

Figure 1:
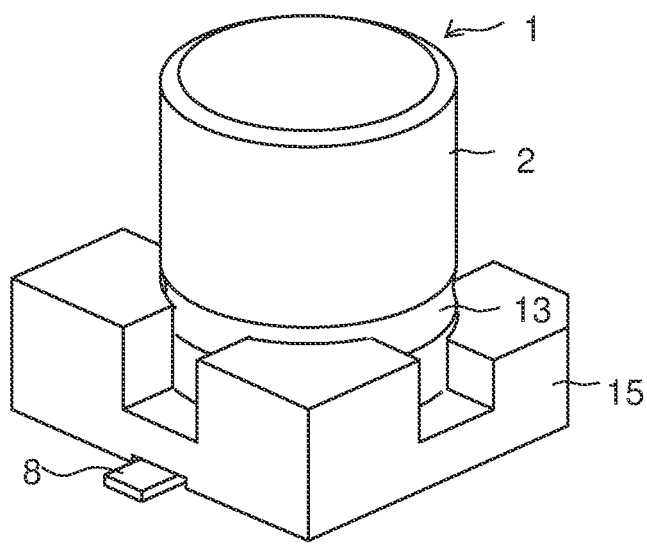
FIG. 1 is a perspective view of a capacitor according to a first embodiment of the present invention, as seen from above.
Figure 2:
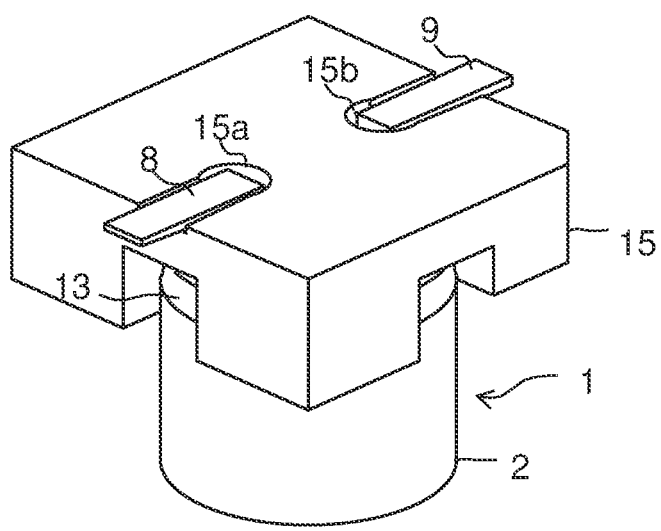
FIG. 2 is a perspective view of the capacitor according to the first embodiment of the present invention, as seen from below.

Hereinafter, embodiments of the present invention will be described with reference to the accompanying drawings. FIGS. 1 and 2 are perspective views of a capacitor 1 according to a first embodiment of the present invention, as seen from above and below respectively. The capacitor 1 is an electrolytic capacitor, and is mounted on a seat plate 15. The seat plate 15 is formed of synthetic resin, and holds the capacitor 1. The seat plate 15 has a pair of through-holes 15a and 15b formed in it.

The capacitor 1 has lead terminals 8 and 9, which are led through the through-holes 15a and 15b in the seat plate 15 and are then bent outward. Thus, with the top face of a body case 2 held by an automated machine, the capacitor 1 is positioned on a circuit board, and is mounted there with the lead terminals 8 and 9 soldered on lands on the circuit board.

Figure 3:
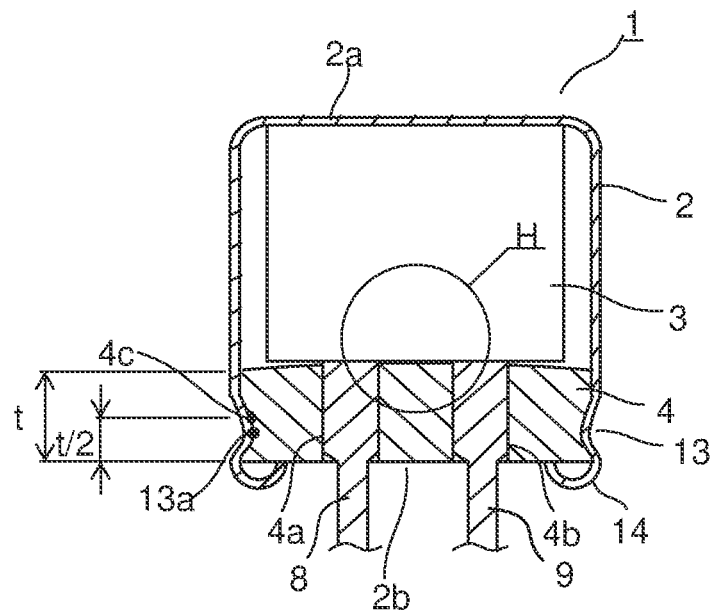
FIG. 3 is a sectional front view of the capacitor according to the first embodiment of the present invention.

FIG. 3 is a sectional front view of the capacitor 1. The capacitor 1 has a body case 2, a capacitor element 3, and a sealing member 4. The body case 2 is formed of metal such as aluminum, in the shape of a bottomed tube with a circular sectional shape. The body case 2 is, at one end, closed with an end wall part 2a, and is, at the other end, left open to have an opening 2b. The capacitor element 3 is housed inside the body case 2, and the opening 2b is sealed with the sealing member 4.

Figure 4:
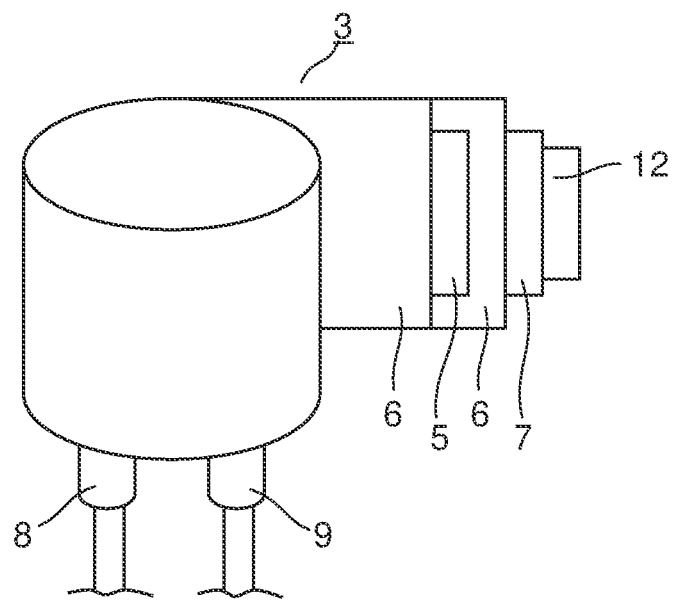
FIG. 4 is a perspective view showing a capacitor element in the capacitor according to the first embodiment of the present invention.

FIG. 4 is a perspective view of the capacitor element 3. The capacitor element 3 has an anode foil 5, a cathode foil 7, and a separator 6, of which each is formed in the shape of an elongate strip. The anode and cathode foils 5 and 7 are, with the separator 6 held in between, wound up into a cylindrical shape to form the capacitor element 3. Thus, the anode and cathode foils 5 and 7 form a pair of electrodes that face each other across the separator 6.

The anode and cathode foils 5 and 7 and the separator 6, each in the shape of a strip, are elongate in the winding direction (longitudinal direction, longer-side direction), and their respective widths in the direction (lateral direction, shorter-side direction) perpendicular to the winding direction are smaller than their respective lengths in the winding direction. The terminal end of the anode or cathode foil 5 or 7 is fastened with tape 12. To the anode foil 5, the lead terminal 8 is connected and, to the cathode foil 7, the lead terminal 9 is connected.

The width of the separator 6 in the lateral direction (axial direction) is larger than the widths of the anode and cathode foils 5 and 7 in the lateral direction. Thus, with respect to the anode and cathode foils 5 and 7, the separator 6 protrudes beyond them upward (toward the end wall part 2a) and downward (toward the opening 2b), and this prevents short-circuiting between the anode and cathode foils 5 and 7.

The anode and cathode foils 5 and 7 are formed chiefly of aluminum, and are given increased surface areas by etching. The anode foil 5 has a dielectric oxide coating formed on its surface by chemical conversion treatment. The cathode foil 7 may have a natural oxide coating formed on its surface, or may have a dielectric oxide coating formed there by chemical conversion treatment.

Used as the separator 6 is a sheet of fiber of cellulose, polyethylene terephthalate, aramid, or the like. For sustained stability at a high temperature (e.g., 150° C.), it is preferable that the separator 6 contain synthetic fiber.

Between the anode and cathode foils 5 and 7 in the capacitor element 3, an electrolytic solution is held. Immersing the capacitor element 3 in the electrolytic solution for a predetermined time permits the electrolytic solution to permeate the separator 6 to be held between the anode and cathode foils 5 and 7. The electrolytic solution functions as the actual cathode. The electrolytic solution also serves to repair defects in the oxide films on the anode and cathode foils 5 and 7.

The electrolytic solution is a liquid preparation having, dissolved in a lipophilic solvent, an electrolyte and a sealing member deterioration preventing agent. As the lipophilic solvent, gamma-butyrolactone can be used. Also usable as the lipophilic solvent is one of polyethylene glycol, glycerol, and polyglycerol coupled with a lipophilic group. For easy permeation of the sealing member deterioration preventing agent in the sealing member 4, it is preferable that the lipophilic solvent contain gamma-butyrolactone.

As the solvent in the electrolytic solution, it is possible to use, along with the lipophilic solvent, sulfolane, ethylene glycol, diethylene glycol, polyethylene glycol, or the like. Here, as necessary, an amphiphilic compound may be added. Usable as the amphiphilic compound is, for example, a derivative of polyethylene glycol, or a copolymer of polyethylene glycol with polypropylene glycol.

The electrolyte, by dissolving in the solvent, dissociates into ions to exert electrical conductivity, and used as the electrolyte is, for example, an organic amine salt of a boric acid compound or of a carboxylic acid compound. Usable as the boric acid compound is, for example, a boro-dioxalic acid ester, a boro-diglycolic acid ester, or a boro-disalicylic acid ester. Usable as the carboxylic acid compound is, for example, phthalic acid, fumaric acid, adipic acid, or maleic acid.

Usable as an organic amine for forming the organic amine salt is, for example, a hydrophobic organic amine such as a tertiary organic amine or a quaternary organic amine. Using a hydrophobic organic amine as the organic amine contained in the electrolytic solution helps enhance the humidity resistance of the capacitor 1.

Examples of such organic amines include aliphatic amines (such as triethylamine, tripropylamine, tributylamine, triamylamine, and trihexylamine), heterocyclic amines (such as pyridine and imidazole), aromatic amines, and derivatives of any of those.

The sealing member deterioration preventing agent is a compound that permeates the sealing member 4 by dissolving in the lipophilic solvent and, as will be described later, is supplied from the capacitor element 3 to the sealing member 4. The sealing member deterioration preventing agent supplied to the sealing member 4 permeates the sealing member 4 through the intermolecular gaps in the sealing member 4. In simple terms, as the sealing member deterioration preventing agent, it is possible to use a compound of which the weight as observed after the sealing member 4 is immersed for one week in a solution having the sealing member deterioration preventing agent dissolved in the lipophilic solvent at a concentration of 10% and then the solution on the surface is wiped off exhibits an increase compared with a sealing member 4 immersed in the lipophilic solvent alone.

Usable as the sealing member deterioration preventing agent is, for example, a terpenoid such as a lipid-soluble vitamin containing an isoprene skeleton (of which the main chain may have single or double bonds or may have a ring structure) within the molecule, an unsaturated fatty acid, a polyglycerol ester containing a unsaturated fatty acid group within the molecule, a saturated fatty acid, or a derivative of any of those.

Examples of lipophilic vitamins include vitamin A, vitamin D, vitamin E, and vitamin K. Vitamin A is a compound that contains a carotenoid skeleton, and includes retinol, β-carotene, α-carotene, β-cryptoxanthin, and astaxanthin. Vitamin D includes vitamin D2 and vitamin D3. Vitamin E includes tocopherols (α-tocopherol, β-tocopherol, γ-tocopherol, δ-tocopherol) and tocotrienols (α-tocotrienol, β-tocotrienol, γ-tocotrienol, and δ-tocotrienol). Vitamin K includes vitamin K1, vitamin K2, and menaquinone-7.

These lipophilic vitamins are terpenoids that contain an isoprene skeleton within the molecule, and have high affinity for the sealing member 4, which is made of rubber. Accordingly, for satisfactory permeation and retention in the sealing member 4, it is preferable to use a lipophilic vitamin as the sealing member deterioration preventing agent. It is preferable that the lipophilic vitamin contain two or more isoprene units, and more preferably three or more isoprene units. Vitamin A and vitamin E are particularly preferable for their strong antioxidant property.

Examples of polyglycerol esters include tetraglycerol triesters containing oleic acid as a fatty acid group.

The electrolytic solution may contain an additive as necessary. Examples of additives include a withstand voltage enhancer (such as polyalkylene glycol), a sugar, glycerol, polyglycerol, a derivative of any of those, a phosphoric acid ester, a gas absorbent, and a hydrophilic antioxidant. A hydrophilic antioxidant does not easily permeate the sealing member 4, and thus it is held within the capacitor element 3 for a long period to serve to suppress oxidation of the capacitor element 3.

In FIG. 3, the sealing member 4 is formed as a molding of an insulating elastic material, in the shape of a disc, and has a pair of through-holes 4a and 4b. The lead terminals 8 and 9 of the capacitor element 3 are press-fitted through the through-holes 4a and 4b. Usable for the sealing member 4 is, for example, butyl rubber, isoprene rubber, silicone rubber, fluorine-containing rubber, ethylene-propylene rubber, orethylene-propylene-diene rubber. Also usable is rubber of a composite material that contains any of those.

Butyl rubber is preferred because it is high in environmental resistance, such as heat aging resistance, chemical resistance, and weather resistance, high in electrical insulation, and low in gas permeation.

With the sealing member 4 placed in the opening 2b of the body case 2, the body case 2 is swaged by being pressed on its outer circumferential face from the outside. This forms a constriction (inward bead) 13 that protrudes inward of the body case 2. The constriction 13 constricts the outer circumferential face of the sealing member 4 inward, and thereby brings it into close contact with the inner circumferential face of the body case 2. Moreover, constricting the sealing member 4 brings the inner faces of the through-holes 4a and 4b into close contact with the lead terminals 8 and 9. Thus, the opening 2b of the body case 2 is sealed with the sealing member 4 so that the electrolytic solution held in the capacitor element 3 may not leak out of the body case 2.

The open end of the body case 2 is folded onto the outer face (facing away from the capacitor element 3) of the sealing member 4 to form a replicated portion 14. The replicated portion 14 and the constriction 13 prevent the sealing member 4 from dropping out of the body case 2.

Figure 5:
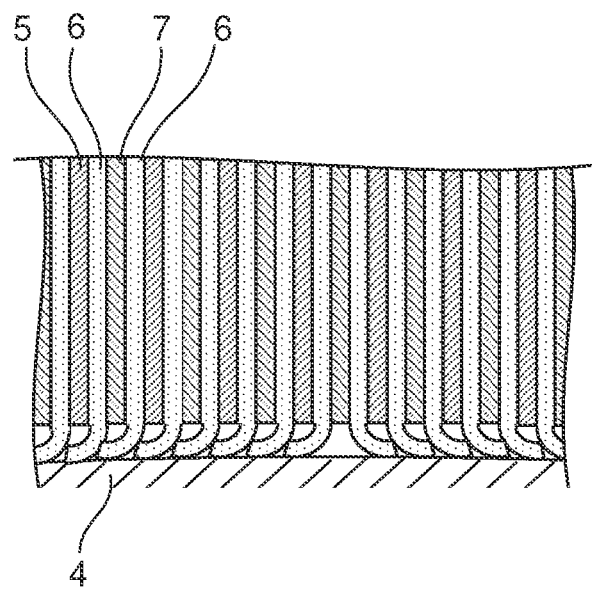
FIG. 5 is a detailed view of part H in FIG. 3.

FIG. 5 is a detailed view of part H in FIG. 3. At least part of the separator 6, which protrudes toward the sealing member 4 beyond the anode and cathode foils 5 and 7, makes contact, at a plurality of points or over an area, with the top face (facing the capacitor element 3) of the sealing member 4 so as to rest on that face.

It is preferable that the width of the separator 6 in the lateral direction be 0.3 mm to 2.0 mm greater than the width of the anode and cathode foils 5 and 7. With a width greater by 0.3 mm or more, the separator 6 can bend such that a bottom end part of the separator 6 reliably makes contact with the top face of the sealing member 4 without applying stress to the anode and cathode foils 5 and 7. On the other hand, giving the separator 6 a lateral-direction width greater by 2.0 mm or more than the width of the anode and cathode foils 5 and 7 leads to an increase in the size of the capacitor 1.

The sealing member 4 is constantly supplied with the electrolytic solution held in the capacitor element 3 through the separator 6. That is, the separator 6 constitutes a supplying portion that lies in contact with the sealing member 4 to supply the electrolytic solution from the capacitor element 3 to the sealing member 4.

Here, as shown in FIG. 3 referred to previously, the ridge 13a of the constriction 13 is arranged farther from the capacitor element 3 than the middle 4c of the sealing member 4 in its thickness direction (i.e., assuming that the sealing member 4 has a thickness t, the position t/2 away from its bottom). Thus, the outer circumferential face of the sealing member 4 is pressed from below as viewed in the illustration, with the result that the top face (facing the capacitor element 3) of the sealing member 4 bulges to be convex upward such that a central part of it protrudes relative to a peripheral part toward the capacitor element 3. This permits the separator 6 to reliably remain in contact, at a plurality of points or over an area, with the sealing member 4 so as to rest on it so that the separator 6 can supply the electrolytic solution to the sealing member 4.

At a high temperature (e.g., 150° C.) in the presence of moisture and oxygen, the ingredients of the rubber forming the sealing member 4 may partly oxidize or thermally decompose, and this may cause the sealing member 4 to contract and develop a crack. A crack in the sealing member 4 reduces the effective thickness of rubber and degrades sealing performance. In this embodiment, the sealing member deterioration preventing agent contained in the electrolytic solution is supplied through the separator 6 to the sealing member 4, and permeates the sealing member 4 through the intermolecular gaps in the sealing member 4. This helps reduce transmission of oxygen and moisture and thereby suppress deterioration of the sealing member 4, and also helps hydration-induced deterioration of the anode and cathode foils 5 and 7 resulting from entry of moisture. It is thus possible to obtain a capacitor 1 with high humidity resistance.

For satisfactory permeation, it is preferable that the molecular weight of the sealing member deterioration preventing agent be 3000 or less, and more preferably 2000 or less. For satisfactory retention in the sealing member 4, it is preferable that the molecular weight of the sealing member deterioration preventing agent be 200 or more, more preferably 250 or more, and particularly preferably 300 or more. Using a sealing member deterioration preventing agent with a molecular weight in such ranges provides satisfactory permeation in the sealing member 4 combined with long-term sustainment of the sealing member deterioration preventing effect.

Using two or more sealing member deterioration preventing agents with different molecular weights allows adjustment of their permeation and retention in the sealing member 4.

For proper adjustment of the balance between the amount of sealing member deterioration preventing agent in the electrolytic solution and its amount permeating the sealing member 4, it is preferable that the solubility parameter (SP value) of the sealing member deterioration preventing agent fall between the SP value of the lipophilic solvent and the SP value of the sealing member 4. For long-term retention of the sealing member deterioration preventing agent in the sealing member 4, it is preferable that the boiling point of the sealing member deterioration preventing agent be higher than that of the lipophilic solvent.

It is preferable that the sealing member deterioration preventing agent be a compound that is oxidized more easily than the ingredients of the sealing member 4 in a temperature range of 150° C. or less. Any compound other than those generally known as antioxidants, if it is oxidized more easily than the ingredients of the sealing member 4, can be used as the sealing member deterioration preventing agent. Preferable examples of such compounds include compounds that exert an antioxidant effect and compounds that contain a double bond within the molecule. Particularly preferable is a compound that exerts an effect of stabilizing or eliminating the radicals arising from the sealing member deterioration preventing agent, because it augments the sealing member deterioration preventing effect.

Then, even if oxygen permeates into the sealing member 4, the sealing member deterioration preventing agent is oxidized before the ingredients of the sealing member 4 are, and thereby exerts an antioxidant effect on the sealing member 4. Here, even if the sealing member 4 oxidizes or thermally decomposes, the sealing member deterioration preventing agent fills the intermolecular gaps in the sealing member 4 and makes the sealing member 4 less likely to contract. This helps suppress cracks in the sealing member 4.

Owing to the sealing member deterioration preventing agent, the sealing member 4 transmits less oxygen and moisture; thus, the sealing member deterioration preventing agent in the electrolytic solution is held in the capacitor element 3 for a long time without undergoing deterioration such as oxidation. Moreover, even as the sealing member deterioration preventing agent in the sealing member 4 is consumed through oxidation or thermal decomposition, the sealing member 4 is constantly supplied with the sealing member deterioration preventing agent from the capacitor element 3. It is thus possible to suppress deterioration of the sealing member 4 for a long period.

The sealing member deterioration preventing agent exerts the effect of suppressing deterioration of the sealing member 4 without reaching the outer surface of the sealing member 4; even so, it is preferable that it reach the outer surface of the sealing member 4. It is then possible to suppress deterioration of the sealing member 4 at its outer surface where it tends to develop a crack, and to more effectively suppress entry of oxygen and moisture.

Here, the sealing member deterioration preventing agent may be in a state where it forms an oil film on the outer surface of the sealing member 4, or in a state where it forms a coating solidified through an oxidation reaction by contact with oxygen in air. The coating helps further suppress permeation of oxygen and moisture. While silicone rubber and fluorine-containing rubber are less airtight than butyl rubber, providing the coating achieves higher airtightness.

It is preferable that the concentration of the sealing member deterioration preventing agent in the electrolytic solution be from 1% by weight to 90% by weight. If the concentration of the sealing member deterioration preventing agent in the electrolytic solution is less than 1% by weight, it is not possible to sustain the effect of suppressing oxidation of the sealing member 4 for a long period. On the other hand, if the concentration of the sealing member deterioration preventing agent in the electrolytic solution is more than 90% by weight, the electrolytic solution has increased viscosity.

This increases the time required for the capacitor element 3 to hold the electrolytic solution and the time required to supply the electrolytic solution from the capacitor element 3 to the sealing member 4, leading to increased man-hours for the capacitor 1. A concentration of 3% by weight to 80% by weight of the sealing member deterioration preventing agent in the electrolytic solution is particularly preferable to achieve more effective suppression of oxidation and hence reduced man-hours.

It is preferable that the ratio by weight of the sealing member deterioration preventing agent in the sealing member 4 to the sealing member 4 be 0.1% by weight to 25% by weight. If the ratio by weight of the sealing member deterioration preventing agent in the sealing member 4 to the sealing member 4 is less than 0.1% by weight, the intermolecular gaps in the sealing member 4 cannot be filled sufficiently, and thus no effect of suppressing transmission of moisture is obtained.

If the ratio by weight of the sealing member deterioration preventing agent in the sealing member 4 to the sealing member 4 is more than 25% by weight, the sealing member 4 may soften or deform. This degrades the sealing performance of the sealing member 4, and makes it impossible to suppress transmission of moisture. It is more preferable that the sealing member 4 after being permeated with the sealing member deterioration preventing agent has a hardness (durometer hardness) of 70 or more at one of the faces of the sealing member 4, because this helps sustain high sealing performance.

The thickness of the sealing member 4 is related to the transpiration rate of the electrolytic solution, the amount of transmitted moisture, and the permeability of the sealing member deterioration preventing agent. To keep low the transpiration rate of the electrolytic solution and the amount of transmitted moisture, it is preferable that the thickness of the sealing member 4 be 1.4 mm or more. To permit the sealing member deterioration preventing agent to permeate the entire sealing member 4 to suppress cracks, it is preferable that the thickness of the sealing member 4 be 7 mm or less.

It is preferable that the area of the sealing member 4 on its side facing the capacitor element 3 be twice or less the area over which the separator 6 makes contact with the sealing member 4 across it, and more preferably 1.8 times or less that. This permits the sealing member deterioration preventing agent to sufficiently permeate substantially the entire face of the sealing member 4 facing the capacitor element 3, and it is thus possible to obtain a capacitor 1 with a long life combined with high humidity resistance. Surface irregularities may be formed on the face of the sealing member 4 facing the capacitor element 3 to increase the contact area between the sealing member 4 and the separator 6 (supplying portion).

The sealing member deterioration preventing agent that has permeated substantially the entire face of the sealing member 4 facing the capacitor element 3 can be confirmed in the following manner. First, after the electrolytic solution on its surface is wiped off, the sealing member 4 is cut into a piece with a thickness of 1 mm and a width of 1 mm radially from the outer circumference, which piece is then crushed. Next, a solution extracted using an organic solvent from the crushed sample is analyzed by liquid chromatograph mass spectrometry (LC-MS) or gas chromatograph mass spectrometry (GC-MS). This permits detection of the sealing member deterioration preventing agent.

The capacitor 1 is manufactured through an element formation process, an element housing process, a sealing member fitting process, a molding process, and a repair process performed in this order. In the element formation process, the anode foil 5 fitted with the lead terminal 8 and the cathode foil 7 fitted with the lead terminal 9 are wound up with the separator 6 held in between, and these are immersed in the electrolytic solution for a predetermined time to form the capacitor element 3.

In the element housing process, the capacitor element 3 is inserted through the opening 2b into the body case 2 to be housed in it. In the sealing member fitting process, the sealing member 4 is inserted, from the opening 2b side, into the body case 2, now with the capacitor element 3 housed inside it, so as to be fitted to the body case 2. The lead terminals 8 and 9 of the capacitor element 3 are press-fitted through the through-holes 4a and 4b in the sealing member 4.

In the molding process, by swaging, the constriction 13 that protrudes inward of the body case 2 is formed, and the open end of the body case 2 is folded to form the replicated portion 14.

In the repair process, the oxide films formed on the anode and cathode foils 5 and 7 are repaired. The repair involves, for example, applying the rated voltage of the capacitor between the lead terminals 8 and 9 for 30 minutes in a high-temperature environment of 125° C. The high-temperature environment at this time promotes permeation of the sealing member deterioration preventing agent across the sealing member 4.

According to this embodiment, the capacitor element 3 holds an electrolytic solution (liquid preparation) having a lipid-soluble sealing member deterioration preventing agent dissolved in a lipophilic solvent, and the liquid preparation supplied by the separator 6 (supplying portion) from the capacitor element 3 permeates the sealing member 4. It is thus possible to suppress an increase of the amount of transmitted moisture resulting from deterioration of the sealing member 4 for a long period. It is hence possible to provide a capacitor 1 with a long lifetime combined with high humidity resistance.

The ratio by weight of the sealing member deterioration preventing agent in the sealing member 4 to the sealing member 4 is 0.1% by weight to 25% by weight. This permits the intermolecular gaps in the sealing member 4 to be filled sufficiently, and helps prevent softening and deformation of the sealing member 4. It is thus possible to reliably suppress transmission of moisture through the sealing member 4, and to further enhance the humidity resistance of the capacitor 1.

Owing to the sealing member deterioration preventing agent being a compound that is oxidized more easily than the ingredients of the sealing member 4, in the event of entry of oxygen into the sealing member 4, the sealing member deterioration preventing agent is oxidized before the ingredients of the sealing member 4 are. This helps more effectively prevent degradation of the sealing member 4 by oxidation, and helps further enhance the humidity resistance of the capacitor 1.

Owing to the sealing member deterioration preventing agent having a molecular weight of 200 to 3000, it easily permeates the sealing member 4 and is retained well, permitting a desired amount of sealing member deterioration preventing agent to be held in the sealing member 4. This helps further enhance the humidity resistance of the capacitor 1.

The liquid preparation held in the capacitor element 3 is an electrolytic solution having, dissolved in a lipophilic solvent, a sealing member deterioration preventing agent and an electrolyte. It is thus easy to produce an electrolytic capacitor with a long lifetime combined with high humidity resistance.

The electrolyte dissolved in the lipophilic solvent contains an organic amine salt, and the electrolytic solution contains a hydrophilic organic amine that forms the organic amine salt. This helps further enhance the humidity resistance of the capacitor 1.

With the separator 6 that makes contact with the sealing member 4, it is easy to form a supplying portion that supplies the liquid preparation (electrolytic solution) held in the capacitor element 3 to the sealing member 4.

A central part of the face of the sealing member 4 facing the capacitor element 3 protrudes relative to a peripheral part of it. This permits the separator 6 to be more reliably kept in contact with the sealing member 4.

The ridge 13a of the constriction 13 that protrudes from the inner face of the body case 2 is arranged farther from the capacitor element 3 than the middle 4c of the sealing member 4 in its thickness direction. It is thus easy to form a sealing member 4 of which a central part of the face facing the capacitor element 3 protrudes relative to a peripheral part of it.

With a lipid-soluble vitamin such as a tocopherol or tocotrienol, it is easy to prepare a lipid-soluble sealing member deterioration preventing agent that prevents deterioration of the sealing member 4 by oxidation.

Using gamma-butyrolactone as the lipophilic solvent makes it easy to prepare a liquid preparation having a sealing member deterioration preventing agent dissolved in it.

Using one of polyethylene glycol, glycerol, and polyglycerol coupled with a lipophilic group as the lipophilic solvent makes it easy to prepare a liquid preparation having a sealing member deterioration preventing agent dissolved in it.

Using a liquid preparation containing a lipophilic solvent, one of sulfolane, ethylene glycol, diethylene glycol, and polyethylene glycol, and an amphiphilic compound makes it easy to prepare a liquid preparation having a sealing member deterioration preventing agent dissolved in it.

In this embodiment, the anode foil 5 may be formed of a valve metal such as tantalum, niobium, or titanium.

Second Embodiment

Figure 6:
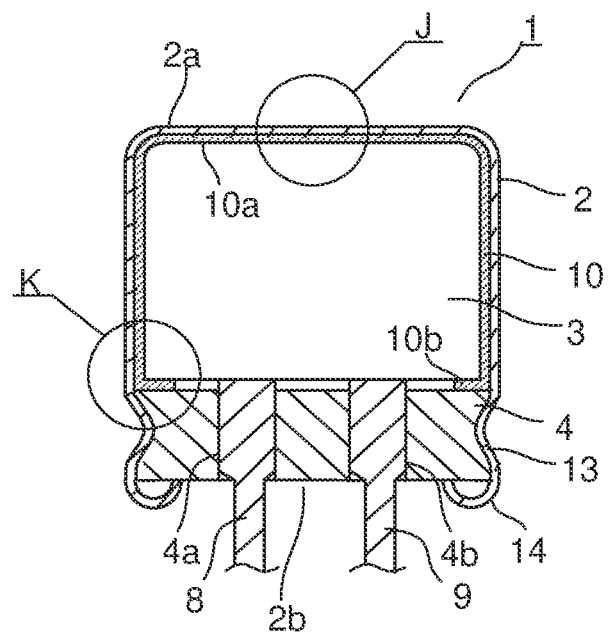
FIG. 6 is a sectional front view of a capacitor according to a second embodiment of the present invention.

FIG. 6 is a sectional front view of a capacitor 1 according to a second embodiment. For convenience' sake, such parts as find their counterparts in the first embodiment shown in FIGS. 1 to 5 referred to previously are identified by the same reference signs. This embodiment differs from the first embodiment in the structure of the supplying portion that supplies the sealing member 4 with a liquid preparation, and is otherwise similar to the first embodiment.

The capacitor 1 includes a body case 2, a capacitor element 3, a sealing member 4, and a liquid supply sheet 10. The body case 2, the capacitor element 3, and the sealing member 4 are formed in similar manners as in the first embodiment.

The liquid supply sheet 10 is formed, for example, by shaping cellulose fiber into a sheet in the shape of a strip, and is arranged between the inner face of the body case 2 and the outer face of the capacitor element 3. The liquid supply sheet 10 has an absorption portion 10a and a contact portion 10b. The absorption portion 10a is arranged to face an end wall part 2a, and makes contact with the separator 6 in the capacitor element 3 to absorb the electrolytic solution containing the sealing member deterioration preventing agent. The contact portion 10b makes contact with the sealing member 4, and supplies the electrolytic solution absorbed from the separator 6 to the sealing member 4. That is, the liquid supply sheet 10 constitutes a supplying portion that makes contact with the sealing member 4 and couples the separator 6 to the sealing member 4 to supply the electrolytic solution from the capacitor element 3 to the sealing member 4.

Opposite side parts of the liquid supply sheet 10 are bent to extend, from the absorption portion 10a facing the end wall part 2a, in the axial direction along the inner circumferential face 2c of the body case 2. Extending in the axial direction, the liquid supply sheet 10 protrudes beyond the capacitor element 3 toward the sealing member 4, but is eventually bent in the radial direction to be arranged so as to face the sealing member 4. In this way, the contact portion 10b is formed in opposite end parts of the liquid supply sheet 10.

Figure 7:
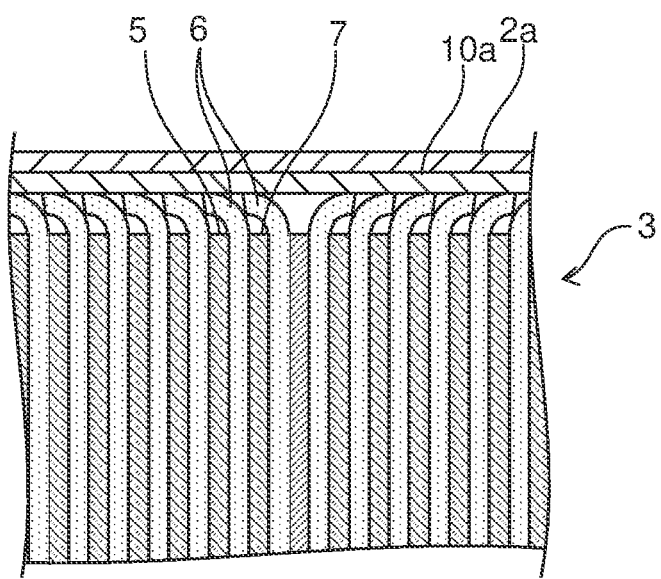
FIG. 7 is a detailed view of part J in FIG. 6.
Figure 8:
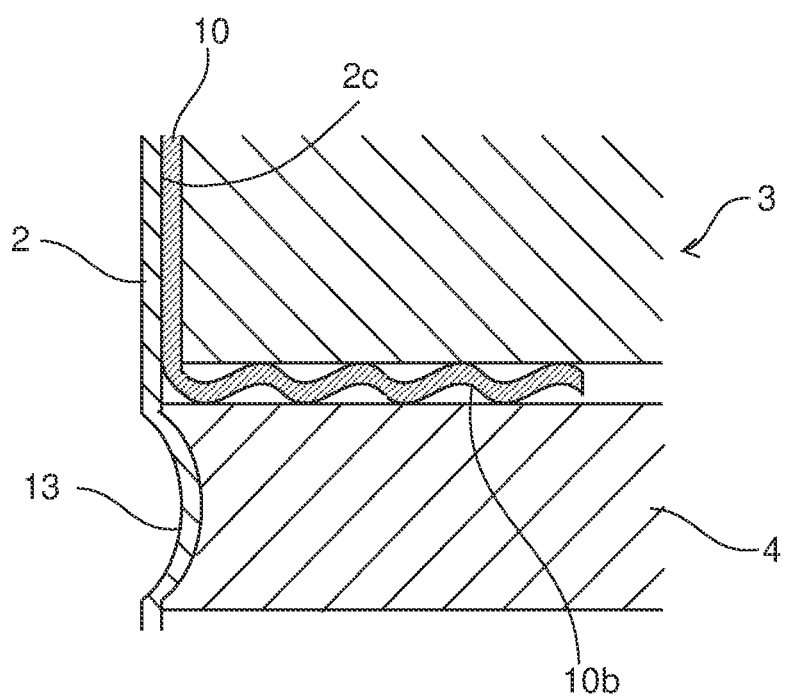
FIG. 8 is a detailed view of part K in FIG. 6.

FIGS. 7 and 8 are detailed views of parts J and K, respectively, in FIG. 6. At least part of the separator 6, which protrudes beyond the anode and cathode foils 5 and 7 toward the end wall part 2a, makes contact, at a plurality of points or over an area, with the absorption portion 10a. Likewise, the contact portion 10b, resulting from bending opposite end parts of the liquid supply sheet 10 in the radial direction, makes contact, at a plurality of points or over an area, with the sealing member 4.

The electrolytic solution absorbed from the separator 6 through the absorption portion 10a is constantly supplied to the sealing member 4 through the contact portion 10b. The electrolytic solution permeates the sealing member 4 through the intermolecular gaps in the sealing member 4. It is thus possible, with the sealing member deterioration preventing agent contained in the electrolytic solution, to suppress deterioration of the sealing member 4 by oxidation for a long period.

Permeated with the electrolytic solution, the liquid supply sheet 10 is in a swollen state. This reduces the range of movement of the capacitor element 3 inside the body case 2, and helps enhance the vibration resistance of the capacitor element 3.

Instead, the absorption portion 10a facing the end wall part 2a may be provided at one end of the liquid supply sheet 10, and the contact portion 10b may be provided at the other end. It is however more preferable to form the liquid supply sheet 10 in a U-shape and provide the absorption portion 10a in a middle part and the contact portion 10b at opposite end parts as in this embodiment, because this ensures reliable supply of the sealing member deterioration preventing agent to the sealing member 4.

The capacitor 1 is manufactured through an element formation process, an element housing process, a sealing member fitting process, a molding process, and a repair process performed in this order. The element formation process, the molding process, and the repair process are similar to those described previously.

Figure 9:
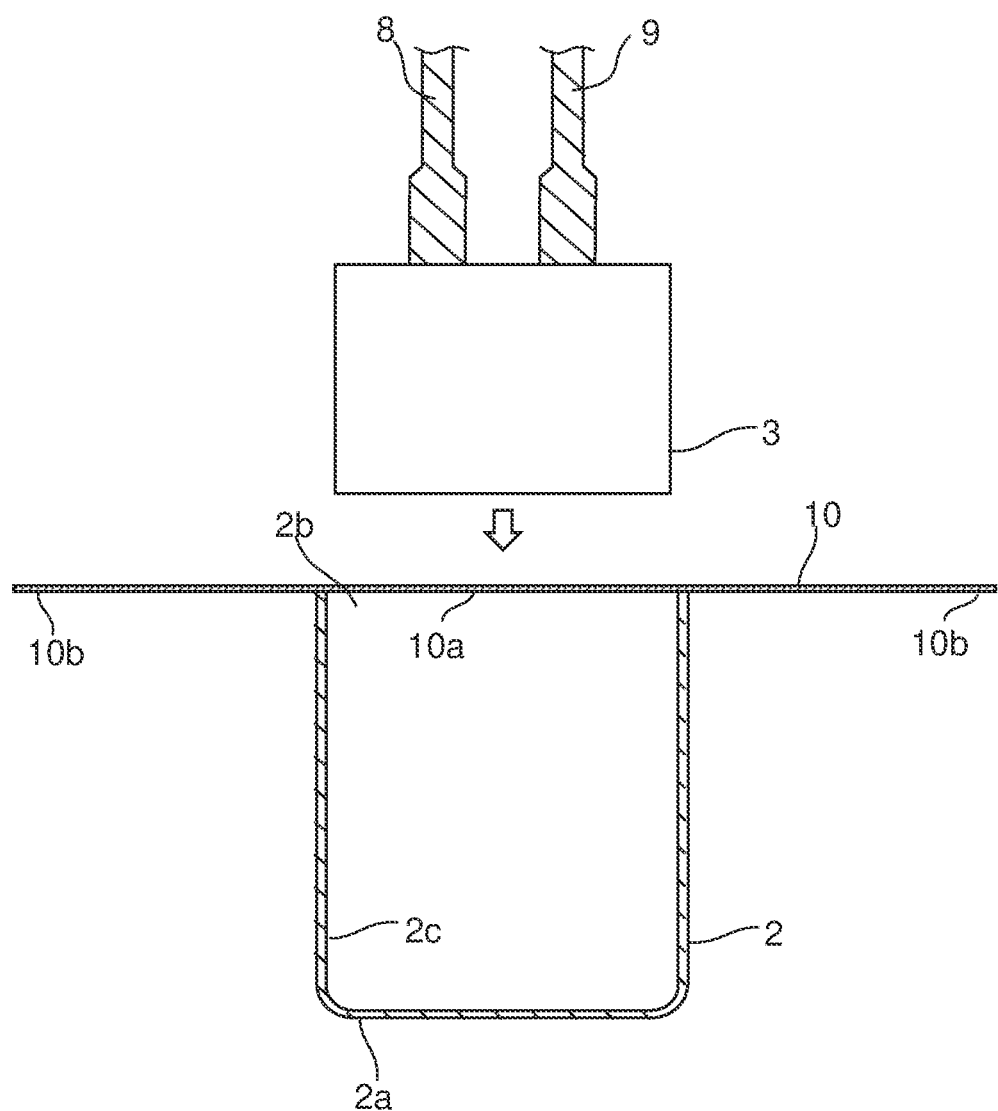
FIG. 9 is a sectional front view showing an element housing process for the capacitor according to the second embodiment of the present invention.
Figure 10:
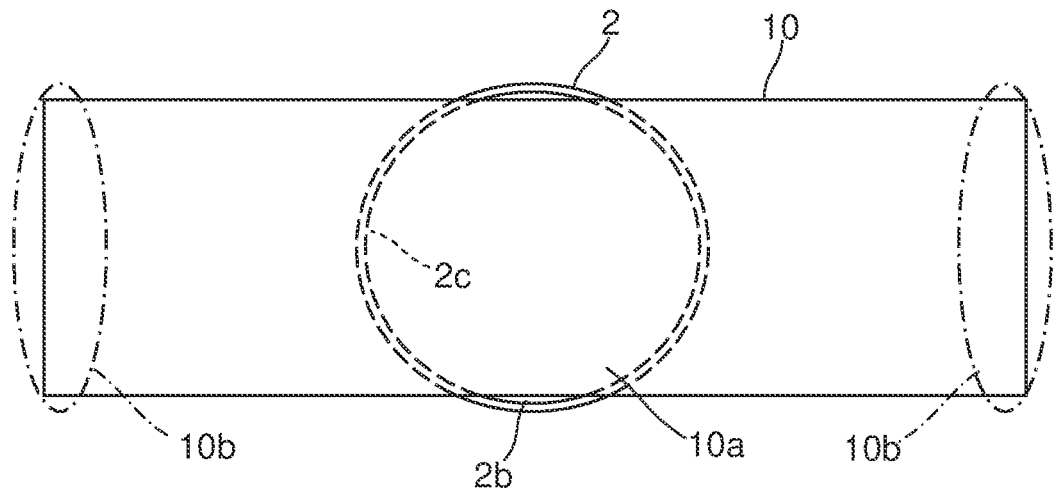
FIG. 10 is a plan view showing the element housing process for the capacitor according to the second embodiment of the present invention.

FIGS. 9 and 10 are a sectional front view and a plan view, respectively, showing the element housing process. In the element housing process, a middle part of the strip-shaped liquid supply sheet 10 in the longitudinal direction is placed on the opening 2b of the body case 2. The width of the liquid supply sheet 10 in the lateral direction is equal to or slightly smaller than the inner diameter of the body case 2. Then, from above the liquid supply sheet 10, the capacitor element 3 is inserted into the body case 2, so that the liquid supply sheet 10 is pushed into the body case 2.

In this way, the liquid supply sheet 10 is arranged in an U-shape between the inner face of the body case 2 and the outer face of the capacitor element 3 housed inside the body case 2. The middle part of the liquid supply sheet 10 in the longitudinal direction forms the absorption portion 10a that faces the end wall part 2a and lies in contact with the separator 6 (see FIG. 7). On the other hand, opposite end parts of the liquid supply sheet 10 in the longitudinal direction protrude beyond the capacitor element 3 housed inside the body case 2, toward the opening 2b (toward the sealing member 4) (see FIG. 11).

Figure 11:
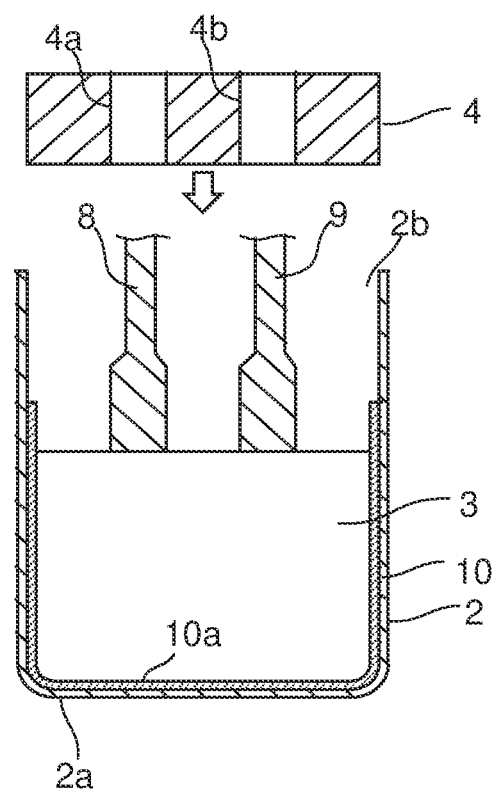
FIG. 11 is a sectional front view showing a sealing member fitting process for the capacitor according to the second embodiment of the present invention.

FIG. 11 is a sectional front view showing the sealing member fitting process. In the sealing member fitting process, the sealing member 4 is inserted, from the opening 2b side, into the body case 2, now with the capacitor element 3 housed in it, to be fitted to the body case 2. The lead terminals 8 and 9 of the capacitor element 3 are press-fitted through the through-holes 4a and 4b in the sealing member 4. Meanwhile, the opposite end parts of the liquid supply sheet 10 in the longitudinal direction are pushed by the sealing member 4 to be bent in the radial direction, forming the contact portion 10b that lies in contact with the inner face (the face facing the capacitor element 3) of the sealing member 4.

According to this embodiment, the capacitor element 3 holds an electrolytic solution (liquid preparation) having a lipid-soluble sealing member deterioration preventing agent dissolved in a lipophilic solvent, and the liquid preparation supplied by the liquid supply sheet 10 (supplying portion) from the capacitor element 3 permeates the sealing member 4. It is thus possible to suppress an increase in the amount of transmitted moisture resulting from deterioration of the sealing member 4 for a long period. It is hence possible to provide a capacitor 1 with a long lifetime combined with high humidity resistance.

With the liquid supply sheet 10 that makes contact with the sealing member 4 to couple the separator 6 to the sealing member 4, it is easy to form a supplying portion that supplies the liquid preparation (electrolytic solution) held in the capacitor element 3 to the sealing member 4.

Third Embodiment

Next, a third embodiment will be described. In this embodiment, as opposed to the capacitor 1 according to the first embodiment, a capacitor element 3 holds a solid electrolyte (not shown) along with an electrolytic solution. Thus, the capacitor 1 is configured as a hybrid electrolytic capacitor. Otherwise this embodiment is similar to the first embodiment.

The solid electrolyte is formed of a conductive polymer. The conductive polymer helps reduce the ESR of the electrolytic capacitor 1. Usable as the conductive polymer is, for example, a polymer of pyrrole, thiophene, aniline, or a derivative of any of those. The conductive polymer is doped with a dopant containing a sulfonic acid group such as polystyrene sulfonic acid. The dopant in the conductive polymer may be self-doped within the molecule by having a substituent group of a sulfonic acid group.

The capacitor element 3 is dried after being immersed in a dispersion liquid or aqueous solution of a conductive polymer for a predetermined time. This permits a solid electrolyte layer formed of the conductive polymer to be held between the anode and cathode foils 5 and 7.

Part of the sulfonic acid groups in the dispersion liquid or aqueous solution function as a dopant for the conductive polymer. The rest of the sulfonic acid groups keep the conductive polymer dispersed or dissolved in water. The sulfonic acid group is strongly acidic and dissolves aluminum; thus, for example, 70% or more of the dispersed or dissolved sulfonic acid groups are neutralized with an alkaline compound. Here, so as not to diminish the permeability of the conductive polymer in the capacitor element 3, the degree of neutralization of the sulfonic acid group is lower than the isoelectric point (10%). Accordingly, the dispersion liquid or aqueous solution contains free sulfonic acid groups that neither function as a dopant nor are neutralized.

The alkaline compound that neutralizes the sulfonic acid group is a hydrophobic organic amine compound. This helps enhance the hydrophobicity of the conductive polymer, and it is thus possible to suppress degradation of the characteristics of the capacitor 1 resulting from the conductive polymer absorbing moisture, and thereby to enhance the humidity resistance of the capacitor 1. Preferable as the hydrophobic organic amine compound is an organic amine that dissolves in a lipophilic solvent without forming a salt at normal temperature.

The sulfonic acid group in the dopant is, in an unneutralized, free state, highly hygroscopic. Thus, adding a hydrophobic organic amine in the electrolytic solution permits the sulfonic acid group, after the solid electrolyte is formed through drying, to be neutralized by the hydrophobic organic amine to form a hydrophobic organic amine salt. The electrolytic solution containing the lipophilic solvent and the organic amine dissolved in it can, by making contact with the conductive polymer, quickly neutralize the sulfonic acid group in the dopant.

In this case, part of the organic amine that neutralizes the sulfonic acid group is organic amine originating from the solute in the electrolytic solution. Using a hydrophobic organic amine for both the organic amine neutralizing in the dopant and the organic amine contained in the electrolytic solution helps further enhance the humidity resistance of the capacitor 1.

The electrolytic solution here, like the one described previously, is a liquid preparation having a sealing member deterioration preventing agent and an electrolyte dissolved in a lipophilic solvent, and covers at least part of the solid electrolyte layer. Used as the electrolyte is, for example, an organic amine salt of a boric acid compound or of a carboxylic acid compound. Using a boric acid compound is preferred, because doing so gives the hybrid capacitor 1 a long lifetime.

It is preferable that the organic amine that forms the organic amine salt in the electrolyte contain a hydrophobic organic amine as mentioned above. Here, the organic amine in the electrolytic solution may be the same as, or different from, the organic amine that neutralizes the sulfonic acid group in the dopant. A plurality of types of organic amines may be used together.

Using a hydrophobic organic amine reduces the hydrophilicity of the sealing member 4, the electrolytic solution, and the conductive polymer. This helps sustain the humidity resistance of the capacitor 1 in a high-temperature environment (e.g., 150° C.). Incidentally, it is preferable that the organic amine contained in the electrolytic solution not contain a hydrophilic organic amine. This makes it possible to sustain the humidity resistance of the capacitor 1 even when the amine neutralizing the sulfonic acid group in the dopant is replaced.

The electrolytic solution brings the solid electrolyte into a swollen state, and this increases the closeness of contact of the solid electrolyte with the anode and cathode foils 5 and 7 holding the solid electrolyte in between. This helps reduce the ESR of the capacitor 1.

The electrolytic solution may contain a hydrolyzable ester compound. Usable as the hydrolyzable ester compound is, for example, a boric acid ester compound, a carboxylic acid ester compound, or a phosphoric acid ester compound. In the presence of moisture, a hydrolyzable ester compound hydrolyzes. A boric acid ester compound hydrolyzes into boric acid and an alcohol or into boric acid and a carboxylic acid. A carboxylic acid ester compound hydrolyzes into a carboxylic acid and an alcohol. A phosphoric acid ester compound hydrolyzes into phosphoric acid and an alcohol. These reactions are promoted in a weakly acidic electrolytic solution. Owing to the moisture in the capacitor 1 being consumed by hydrolysis of the hydrolyzable ester compound, it is possible to reduce extra moisture in the electrolytic solution and further enhance the humidity resistance of the capacitor 1.

Examples of carboxylic acid esters include phthalic acid esters, maleic acid esters, and adipic acid esters. A carboxylic acid produced by hydrolysis of a carboxylic acid ester can be an electrolyte in the electrolytic solution.

Examples of boric acid ester compounds include boro-dioxalic acid esters, boro-diglycolic acid esters, and boro-disalicylic acid esters. A boric acid ester compound can double as an electrolyte in the electrolytic solution.

In a case where the electrolytic solution contains a boric acid ester compound, it is preferable that the concentration of the boric acid ester compound in the electrolytic solution be 0.1% by weight to 20% by weight. If the concentration of the boric acid ester compound in the electrolytic solution is less than 0.1% by weight, the effect of keeping a constant moisture level is insufficient. If the concentration of the boric acid ester compound in the electrolytic solution exceeds 20% by weight, the products resulting from hydrolysis precipitate in the fiber of the separator 6 or on the surface of the anode or cathode foil 5 or 7, and this degrades the characteristics of the capacitor 1.

The capacitor 1 according to this embodiment was subjected to a durability test. In the capacitor 1 of this embodiment that was tested, the electrolytic solution contained gamma-butyrolactone as the lipophilic solvent, boro-disalicylic acid triethyl amine as the electrolyte, and $\alpha$-tocopherol as the sealing member deterioration preventing agent. The concentration of the sealing member deterioration preventing agent in the electrolytic solution was 10% by weight. A capacitor element 3 with a diameter of 9.0 mm was immersed in a dispersion liquid of a conductive polymer that contained polystyrene sulfonic acid as a dopant, and was then taken out of the liquid and dried to obtain a solid electrolyte. The sealing member 4 was formed of butyl rubber, with a diameter of 9.2 mm and a thickness of 2.7 mm.

As a comparative example, a capacitor was prepared that was the same as the capacitor 1 according to this embodiment except that the electrolytic solution contained no sealing member deterioration preventing agent.

For each of the capacitor 1 of this embodiment and the capacitor of the comparative example, 20 samples were left in a high-temperature environment of 150° C. for 2000 hours. Five samples of the capacitor of the comparative example developed a crack in the sealing member 4 with a depth one third of the thickness of the sealing member 4. By contrast, none of the samples of the capacitor 1 of this embodiment developed any visually recognizable crack in the sealing member 4.

Figure 12:
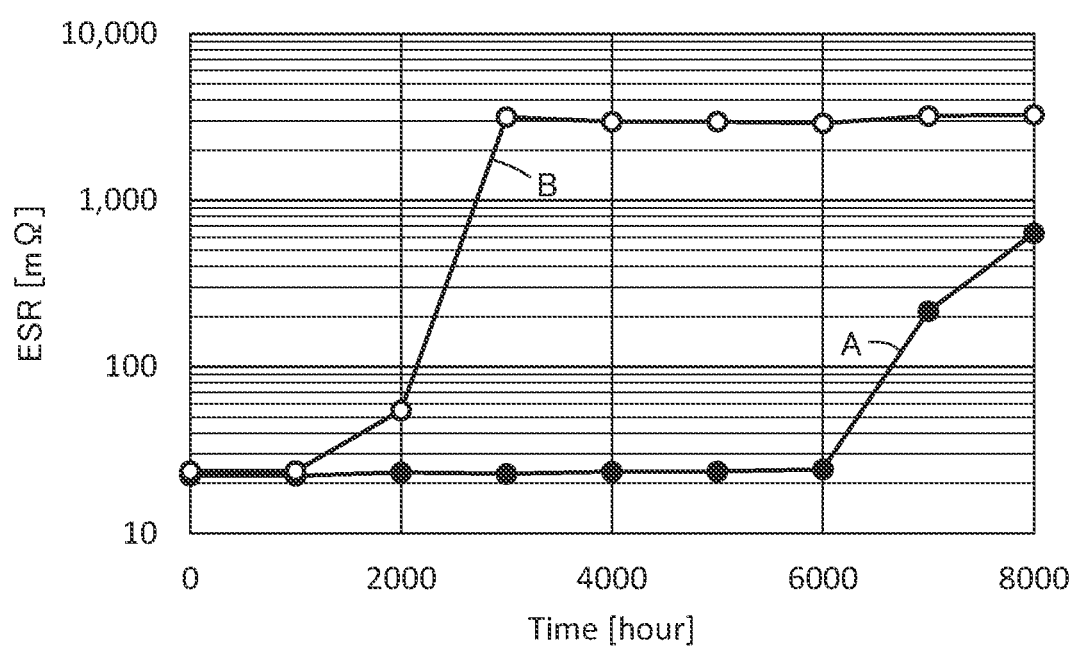
FIG. 12 is a diagram showing the results of a high-temperature high-humidity load test with a capacitor according to a third embodiment of the present invention.

Next, the 20 samples of the capacitor 1 of this embodiment as well as the five samples of the capacitor of the comparative example that developed a crack in the above test were subjected to a high-temperature high-humidity load test. In the high-temperature high-humidity load test, the rated voltage was applied in an environment of a temperature of 85° C. and a relative humidity of 85%, and the ESR was measured every 1000 hours. FIG. 12 shows the results, the vertical axis representing the ERS (in m$\Omega$) and the horizontal axis representing the elapsed time (in hours). In the diagram, the letter "A" indicates the capacitor 1 of this embodiment, and the letter "B" indicates the capacitor of the comparative example.

The results reveal that, while the comparative example exhibited a sharp rise in ESR after the lapse of 2000 hours, the capacitor 1 of this embodiment kept a low ESR until the lapse of 6000 hours. This confirms that the capacitor 1 of this embodiment offers high humidity resistance and stable characteristics for a long period.

According to this embodiment, as with the first embodiment, the electrolytic solution (liquid preparation) supplied by the separator 6 (supplying portion) from the capacitor element 3 permeates the sealing member 4. It is thus possible to suppress an increase in the transmitted moisture resulting from deterioration of the sealing member 4. It is hence possible to provide a capacitor 1 with a long lifetime combined with high humidity resistance.

The conductive polymer contains a dopant having a sulfonic acid group, and the electrolytic solution contains a hydrophobic organic amine; thus, the sulfonic acid is neutralized by the hydrophobic organic amine. It is thus possible to suppress degradation of the characteristics of the capacitor 1 resulting from the conductive polymer absorbing moisture, and to enhance the humidity resistance of the capacitor 1.

The dopant in the conductive polymer has a substituent group of a sulfonic acid group, and the electrolytic solution contains a hydrophobic organic amine; thus, the sulfonic acid is neutralized by the hydrophobic organic amine. It is thus possible to suppress degradation of the characteristics of the capacitor 1 resulting from the conductive polymer absorbing moisture, and to enhance the humidity resistance of the capacitor 1.

The electrolytic solution contains a hydrolyzable ester compound. It is thus possible, through hydrolysis of the hydrolyzable ester compound, to reduce excess moisture in the electrolytic solution and thereby further enhance the humidity resistance of the capacitor 1.

By setting the concentration of a boric acid ester compound in the electrolytic solution to 0.1% by weight to 20% by weight, it is possible to keep a fixed moisture level in the capacitor 1, and to prevent degradation of the characteristics of the capacitor 1 due to precipitates resulting from hydrolysis.

In this embodiment, as in the second embodiment, the electrolytic solution may be supplied to the sealing member 4 through a liquid supply sheet 10.

Fourth Embodiment

Next, a fourth embodiment will be described. In this embodiment, as opposed to the capacitor 1 according to the first embodiment, a capacitor element 3 holds, instead of an electrolytic solution, a solid electrolyte (not shown) along with a predetermined liquid preparation. Otherwise this embodiment is similar to the first embodiment.

The solid electrolyte held in the capacitor element 3 is formed of a conductive polymer similar to that in the third embodiment.

Between the anode and cathode foils 5 and 7, a liquid preparation having a sealing member deterioration preventing agent dissolved in a lipophilic solvent is held. As the lipophilic solvent and the sealing member deterioration preventing agent, a lipophilic solvent and a lipid-soluble sealing member deterioration preventing agent like those contained in the electrolytic solution in the first embodiment can be used.

The liquid preparation held in the capacitor element 3 is supplied through the separator 6 to the sealing member 4, and permeates the sealing member 4. This helps prevent deterioration of the sealing member 4. Thus, the liquid preparation held in the capacitor element 3 constitutes a functional liquid with a function of enhancing the humidity resistance of the capacitor 1.

The functional liquid may contain a withstand voltage enhancer or a conductivity enhancer. Usable as the withstand voltage enhancer is, for example, polyalkylene glycol. Usable as the conductivity enhancer is, for example, a compound containing a hydroxy group, such as a sugar or glycerol.

The functional liquid brings the solid electrolyte into a swollen state, and this increases the closeness of contact of the solid electrolyte with the anode and cathode foils 5 and 7. It is thus possible to reduce the ESR of the capacitor 1. Thus, the functional liquid also has a function of reducing the ESR of the capacitor 1.

The functional liquid may have a function of enhancing any other characteristics of the capacitor 1.

According to this embodiment, as with the first embodiment, the capacitor element 3 holds a functional liquid (liquid preparation) having a lipid-soluble sealing member deterioration preventing agent dissolved in a lipophilic solvent, and the liquid preparation supplied by the separator 6 from the capacitor element 3 permeates the sealing member 4. It is thus possible to suppress an increase of the amount of transmitted moisture resulting from deterioration of the sealing member 4. It is hence possible to provide a capacitor 1 with a long lifetime combined with high humidity resistance.

In this embodiment, as in the second embodiment, the functional liquid may be supplied to the sealing member 4 through a liquid supply sheet 10.

According to the first to fourth embodiments, any other types of capacitors such as electric double layer capacitors may likewise be configured such that a liquid preparation supplied from a capacitor element is made to permeate the sealing member 4. The electrodes (anode and cathode foils 5 and 7) of the capacitor element 3 are not limited to being wound up while facing each other across the separator 6, but may be a pair of flat electrodes facing each other across a separator.

INDUSTRIAL APPLICABILITY

The present invention finds applications in capacitors such as electrolytic capacitors, and in vehicles, electronic devices, and the like that incorporate circuits including capacitors.

REFERENCE SIGNS LIST

1 capacitor
2 body case
2*a* end wall part
2*b* opening
2*c* inner circumferential face
3 capacitor element
4 sealing member
4*a*, 4*b* through-hole
5 anode foil
6 separator
7 cathode foil
8, 9 lead terminal
10 liquid supply sheet
10, 11 through-hole
10*a* absorption portion
10*b* contact portion
12 tape
13 constriction
13*a* ridge
14 replicated portion
15 seat plate
15*a*,15*b* through-hole

The invention claimed is:

1. A capacitor, comprising:
a capacitor element that has a predetermined liquid preparation held between a pair of electrodes facing each other across a separator;
a body case in which the capacitor element is housed; and
a sealing member that is made of rubber and that seals the body case, wherein
the capacitor has a supplying portion that makes contact with the sealing member and that supplies the liquid preparation held in the capacitor element to the sealing member, the liquid preparation has a lipid-soluble sealing member deterioration preventing agent dissolved in a lipophilic solvent, the sealing member deterioration preventing agent supplied by the supplying portion to the sealing member permeates the sealing member, a ratio by weight of the sealing member deterioration preventing agent in the sealing member to the sealing member is 0.1% by weight to 25% by weight, and the sealing member deterioration preventing agent has a molecular weight of 200 to 3000.

2. The capacitor according to claim 1, wherein the sealing member deterioration preventing agent is a compound that is oxidized more easily than ingredients of the sealing member.

3. The capacitor according to claim 1, wherein the liquid preparation is an electrolytic solution having, dissolved in the lipophilic solvent, the sealing member deterioration preventing agent and an electrolyte.

4. The capacitor according to claim 3, wherein
the electrolyte contains an organic amine salt, and
the electrolytic solution contains a hydrophobic organic amine that forms the organic amine salt.

5. The capacitor according to claim 4, wherein
the capacitor element holds a solid electrolyte formed of a conductive polymer, and
the conductive polymer contains a dopant having a sulfonic acid group.

6. The capacitor according to claim 4, wherein
the capacitor element holds a solid electrolyte formed of a conductive polymer, and
a dopant in the conductive polymer has a substituent group of a sulfonic acid group.

7. The capacitor according to claim 3, wherein
the capacitor element holds a solid electrolyte formed of a conductive polymer, and
the electrolytic solution contains a hydrolyzable ester compound.

8. The capacitor according to claim 7, wherein
the hydrolyzable ester compound is a boric acid ester compound, and
a concentration of the boric acid ester compound in the electrolytic solution is 0.1% by weight to 20% by weight.

9. The capacitor according to claim 1, wherein the capacitor element holds a solid electrolyte formed of a conductive polymer.

10. The capacitor according to claim 1, wherein the supplying portion is formed by the separator.

11. The capacitor according to claim 10, wherein a central part of a face of the sealing member facing the capacitor element protrudes relative to a peripheral part of the face.

12. The capacitor according to claim 11, wherein
the body case has a constriction that protrudes from an inner face of the body case to press an outer circumferential face of the sealing member, and
a ridge of the constriction is arranged farther from the capacitor element than a middle of the sealing member in a thickness direction thereof.

13. The capacitor according to claim 1, wherein the supplying portion couples the separator with the sealing member.

14. The capacitor according to claim 1, wherein the sealing member deterioration preventing agent is a lipid-soluble vitamin.

15. The capacitor according to claim 14, wherein the lipid-soluble vitamin is a tocopherol or tocotrienol.

16. The capacitor according to claim 1, wherein the lipophilic solvent is gamma-butyrolactone.

17. The capacitor according to claim 1, wherein the lipophilic solvent is one of polyethylene glycol, glycerol, and polyglycerol coupled with a lipophilic group.

18. The capacitor according to claim 1, wherein the liquid preparation contains:
the lipophilic solvent;
one of sulfolane, ethylene glycol, diethylene glycol, and polyethylene glycol; and
an amphiphilic compound.

* * * * *